United States Patent [19]

Pariani

[11] Patent Number: 4,588,356
[45] Date of Patent: May 13, 1986

[54] HELICOPTER ROTOR

[75] Inventor: Emilio Pariani, Cardano al Campo, Italy

[73] Assignee: Costruzioni Aeronautiche Giovanni Agusta S.p.A., Cascina Costa di Samarate, Italy

[21] Appl. No.: 558,182

[22] Filed: Dec. 5, 1983

[30] Foreign Application Priority Data

Dec. 6, 1982 [IT] Italy .................. 68427 A/82

[51] Int. Cl.⁴ .................. B64C 27/35; B64C 27/51
[52] U.S. Cl. .................. 416/140; 416/107; 416/134 A; 416/141
[58] Field of Search ............ 416/134 A, 138 A, 141, 416/140 A, 106, 107

[56] References Cited

U.S. PATENT DOCUMENTS

| | | | |
|---|---|---|---|
| 3,556,673 | 1/1971 | Killian | 416/134 A |
| 3,761,199 | 9/1973 | Ferris et al. | 416/134 A |
| 3,764,230 | 10/1973 | Rybicki et al. | 416/141 X |
| 3,853,426 | 12/1974 | Rybicki | 416/140 A |
| 3,862,812 | 1/1975 | Gorndt et al. | 416/141 |
| 3,967,918 | 7/1976 | Mouille et al. | 416/134 A X |
| 4,012,169 | 3/1977 | Mouille et al. | 416/134 A |
| 4,028,002 | 6/1977 | Finney et al. | 416/134 A |
| 4,135,856 | 1/1979 | McGuire | 416/134 A |
| 4,232,563 | 11/1980 | Peterson et al. | 416/141 X |
| 4,235,570 | 11/1980 | Ferris et al. | 416/140 A X |
| 4,242,047 | 12/1980 | Ferris et al. | 416/141 X |
| 4,249,862 | 2/1981 | Waddington et al. | 416/134 A |
| 4,297,078 | 10/1981 | Martin | 416/134 A |
| 4,304,525 | 12/1981 | Mouille | 416/134 A |
| 4,341,499 | 7/1982 | Peterson | 416/141 X |
| 4,365,936 | 12/1982 | Hatch | 416/134 A |
| 4,369,019 | 1/1983 | Lovera et al. | 416/134 A |

FOREIGN PATENT DOCUMENTS 2041310  8/1980  United Kingdom ........... 416/134 A

Primary Examiner—Everette A. Powell, Jr.
Attorney, Agent, or Firm—Frost & Jacobs

[57] ABSTRACT

Helicopter rotor on which a number of blades are each connected to a perimetrical bridge element on a hub by means of a fork element extending round the said bridge element and connected to it by means of two elastomer supports, arranged in series, of which one is designed to dampen at least operation of the blade in the hub plane.

4 Claims, 3 Drawing Figures

HELICOPTER ROTOR

BACKGROUND OF THE INVENTION

The present invention relates to a helicopter rotor, in particular, one on which the hub is essentially designed in the form of a flat plate with radial arms, the free ends of which are connected to one another by perimetrical bridge elements, each for connecting a blade to the hub.

On known rotors of the above type, the connection is generally made using a fork element extending round the bridge element and arranged radially with its open end facing outward to receive the connecting end of the blade. Between each fork element and the bridge element, an elastomeric bearing is usually employed for relieving the centrifugal shearing forces transmitted by the blade to the bridge element and, consequently, to the hub. The forces in the hub plane caused by drag, on the other hand, are relieved by dampers essentially arranged in the hub plane itself, between a point on each blade and a point on the hub rim away from the blade connecting point.

A major drawback of known rotors of the above type is the presence of the dampers, operation of which is usually limited to relatively short periods but the presence of which results in a considerable increase in the weight of the rotor, and makes dynamic balancing extremely difficult and is a frequent cause of breakage.

SUMMARY OF THE INVENTION

The aim of the present invention is to provide a helicopter rotor which, while providing for correct control of blade oscillation in the hub plane and in relation to the hub itself, has none of the above described conventional type dampers.

With these aims in view, the present invention relates to a helicopter rotor comprising an essentially flat hub with a number of radial arms, the free ends of which are connected to one another by perimetrical bridge elements, a number of radial blades and means for connecting each blade to the bridge elements; the connecting means comprising a fork element extending round the bridge element, first elastomeric bearing means between the bridge element and the fork element, and damping means between the latter and the hub for controlling operation of the blade essentially in the hub plane, characterised by the fact that the damping means comprise second elastomeric bearing means serially connected to the first elastomeric bearing means between the fork element and the bridge element.

BRIEF DESCRIPTION OF THE DRAWINGS

The invention will now be described by way of non-limiting examples with reference to the attached drawings in which.

DETAILED DESCRIPTION OF THE INVENTION

Figure 1:
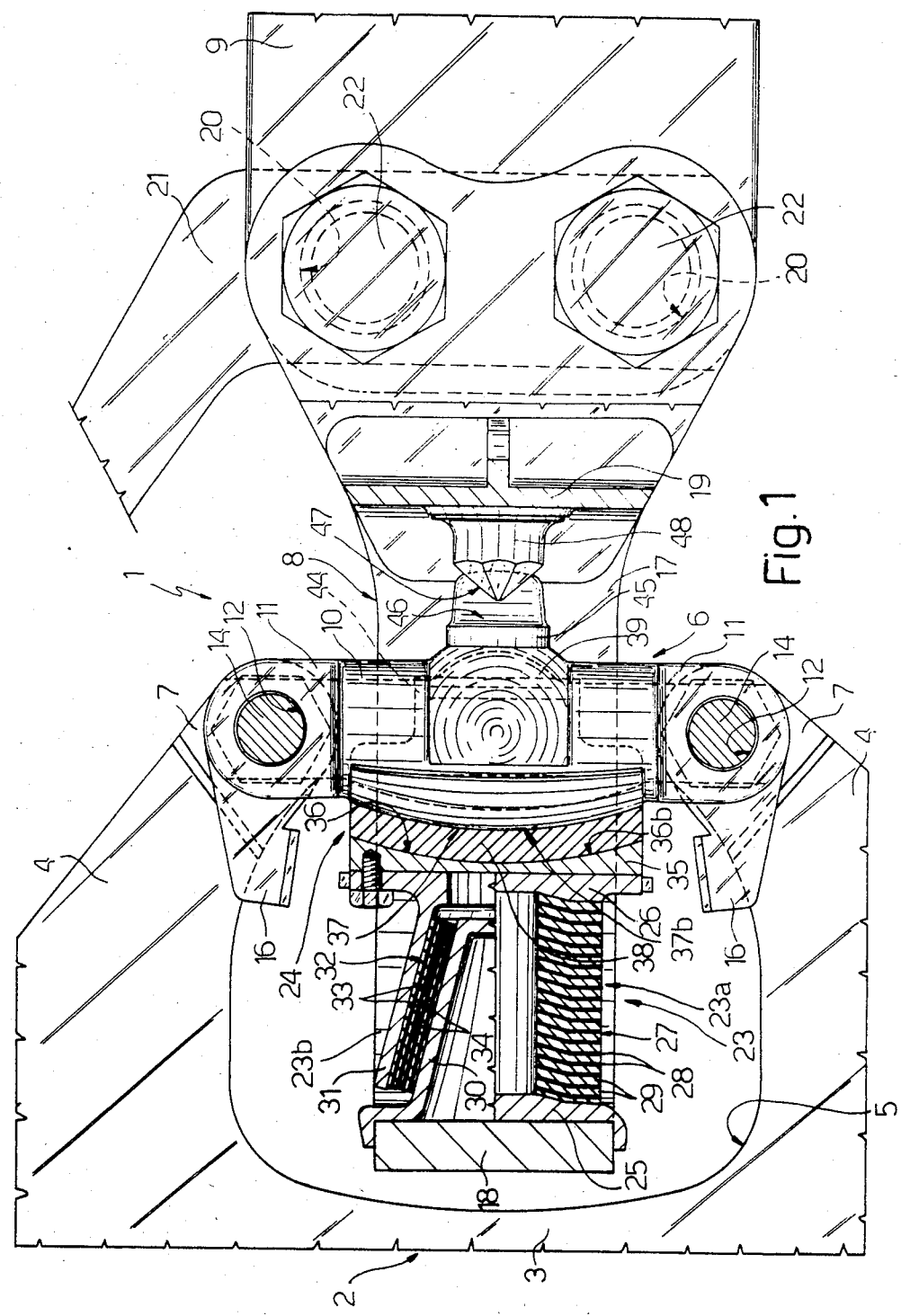
FIG. 1 shows a partial plan view with sections of a first and second arrangement of the helicopter rotor covered by the present invention.

Number 1 in FIG. 1 indicates a helicopter rotor comprising a hub (2) essentially in the form of a flat plate. The latter comprises a centre area (3), which can be connected integral a main drive shaft (not shown) with which turns round its own centre axis (not shown), and a number of perimetrical radial arms (4). Each pair of radial arms (4) defines a cavity (5) closed at the outer end by a bridge element (6) integral with tabs (7) on the free ends of the two arms (4). Each bridge element (6) supports a connected fork element (8) for supporting a blade (9).

Figure 2:
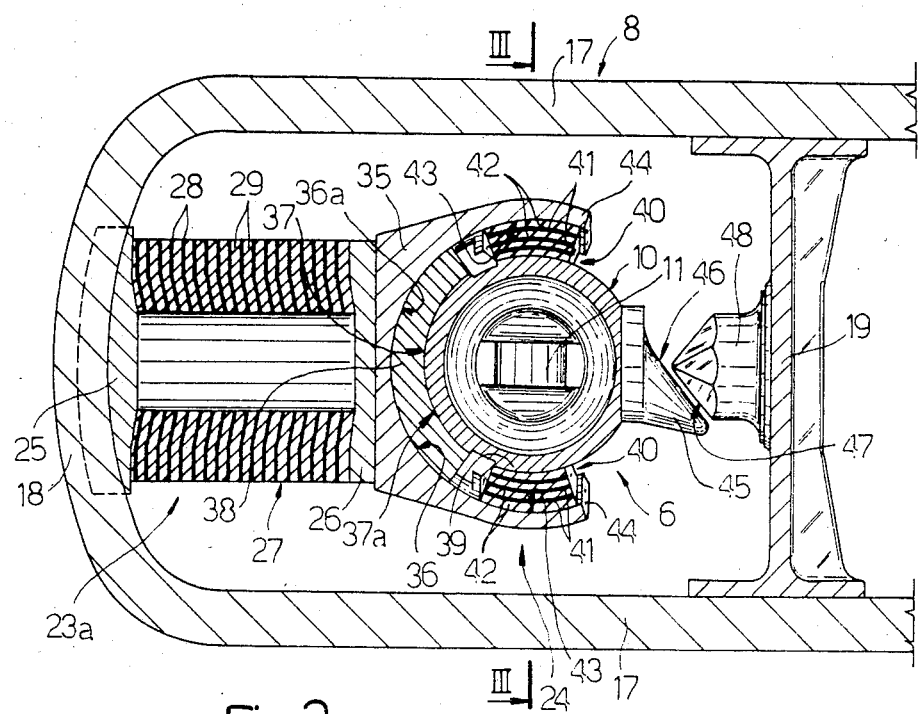
FIG. 2 shows a radial section along line II—II in FIG. 3 of the said first arrangement of the rotor according to the present invention.
Figure 3:
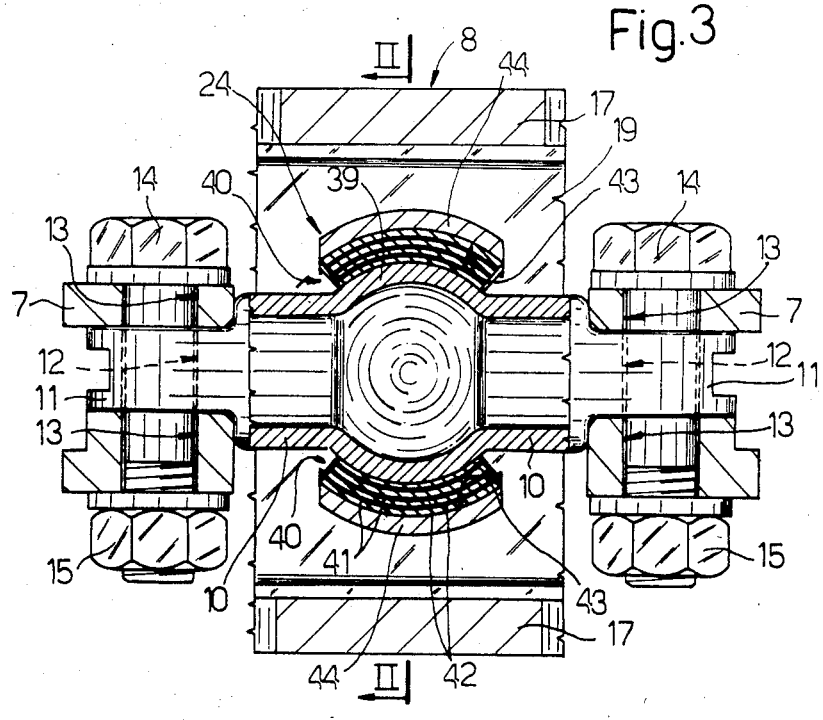
FIG. 3 shows a section along line III—III in FIG. 2.

As shown in FIG. 3, each bridge element (6) comprises a tubular pin (10) with a flat tab (11) connected on each end. The tab has a hole (12) the axis of which is parallel to that of hub 2 and coincident with the axis of hole 13 through tab 7. Each pair of tabs 7 and 11 is connected by means of a through bolt (14) extending aligned holes 12 and 13 and fitted with a torque nut (15). Besides clamping pin 10 on arm 4, nut 15 is also designed to clamp an essentially L-shaped bracket (16), one leg of which is fitted with bolt 14, while the other extends inside cavity 5 to form a limit stop for the oscillation of blade 9 in the plane of hub 2. As shown in FIG. 2, each fork element (8) consists essentially of a plate, bent in the shape of a U to form two arms (17), one on top of the other and essentially parallel to the plane of the hub 2 from which they extend radially outward. The two arms (17) are connected to each other by a curved end section (18) through cavity 5 and an intermediate plate (19) on the outer side of bridge element 6.

As shown in FIG. 1, the outer end of each arm (17) has two holes (20) aligned with two matching holes on the othher arm (17) and with two holes (not shown) on the connecting end of blade 9 and the end arm of a pitch regulating lever (21) integral with the blade (9). The holes are fitted with two bolts (22) for connecting each fork element (8) to the blade (9).

Each blade-fork (9-8) assembly is connected to bridge element 6 with two elastomeric bearings (23, 24) inbetween.

As shown in FIG. 1, support 23 is a radial thrust type for transmitting centrifugal and shearing stress and enabling pitch adjustment. On a first arrangement of rotor 1, support 23 consists of a cylindrical elastomeric bearing (23a) comprising a flat inner (25) and outer (26) shoe integral with the opposite ends of a cylindrical pile (27) consisting of a number of metal washers (28) with alternating elastomeric washers (29) integral with washers 28. On an alternative arrangement of rotor 1, support 23 consists of a tapered elastomer support (23b) with its tip on the centre of the axis of pin 10 and comprising a truncated inner cone (30) and outer cone (31), the inner cone being partially inserted inside the outer cone. Between the inner and outer cone is a pack (32) of truncated-cone metal blades (33) with alternative truncated-cone elastomeric blades (34) integral with blades 33. The pact 32 is secured to both inner cone 30 and outer cone 31.

As shown in FIG. 2, elastomeric bearing 24 is a radial sector type for transmitting shearing stress and absorbing lift and drag moments.

Elastomeric bearing 24 is what is commonly known as an "olive" type, that is, comprising an outer and inner cap connected loosely to each other with a layer of elasomer inbetween and connected integral to the corresponding surfaces of the inner and outer cap. The surfaces are shaped similar to an olive or, rather, a rugby ball and are obtained by rotating the arc of a circle round a non-diametrical chord and removing the ends of the resulting revolving solid. Two such olive-shaped faces, one convex and the other concave, correspond to form a universal joint that enables the two faces to pivot about small angles as well as pivot about any axis perpendicular to it.

On support 24, the convex outer cap is defined by an essentially U-shaped metal shoe (35) integral inwardly with outer shoe 26 (31) on bearing 23. The inner shoe 25 is integral with curved section 18 on fork element 8. Shoe 35 is bordered outwardly by a curved "olive-shaped" face (36) with its concave section facing blade 9. The section of face 36 in the plane passing through the axis of rotor 1 and the axis of blade 9 forms an arc of a circle (36a-FIG. 2) coaxial with the axis of pin 10, whereas the section of face 36 in the plane passing through the axis of pin 10 and parallel to the plane of hub 2 forms an arc of a circle (36b-FIG. 1) greater in diameter than the arc of a circle 36a. On support 24, the inner cap is defined by a convex "olive-shaped" side face (37) of pin 10 which corresponds with face 36 by means of an elastomeric layer (38). The section of face 37 in the plane passing through the axis of rotor 1 and the axis of blade 9 is an arc of a circle (37a-FIG. 2) coaxial with the axis of pin 10, whereas the section of face 37 in the plane passing through the axis of pin 10 and parallel to the plane of hub 2 is an arc of a circle (37b-FIG. 1) concentric with arc 36b. Pin 10 has a centre boss or cap (39), the outer face of which is shaped like a spherical crown. A section of the crown, in the plane perpendicular to the axis of pin 10, is an arc of a circle equal in radius to arc 37a and coaxial with it. Cap 39 is connected integral with the inner face of two pads (40) arranged on diametrically-opposed sides of cap 39 along a diameter essentially parallel to the axis of rotor 1. Each pad (40) consists of a pile of metal blades (41) with alternating elastomeric blades (42) inbetween. The outer face of each pad (40) is integral with face 43 on the inner face of tab 44 projecting from shoe 35. The face 43 is shaped like a ball cap, concentric with cap 39 and mating with its outer face.

Pin 10 is connected with a radial tab (45) extending towards blade 9 and having a sloping face (46), which engages with a faceted end face (47) of pin 48 extending from plate 19 to pin 10 to control downward flapping of blade 9.

When in use, elastomer support 24 acts as a damper for dampening blade oscillation in the vertical plane and particularly in the horizontal plane, i.e. that of hub 2.

The damping capacity of bearing 24 for the oscillation in the horizontal plane may be adjusted by simply varying the curvatures of faces 36b and 37b, the centers of which coincide with a virtual hinge about which blade 9 performs its drag oscillations, i.e., the oscillations due to the forces acting on blade 9 in the plane of the hub 2.

In other words, by varying in the aforementioned horizontal plane (that is the plane of FIG. 1), the radii of faces 36b and 37b from infinite (faces 36b and 37b being cylindrical) to values according to which their centers coincide with the center of cap 39 (drag center coinciding with flap center), it is possible to switch from a rigid rotor to a substantially fully articulated rotor.

I claim:

1. An articulated rotor for helicopters comprising a rotary hub mounted for rotation about an axis, said hub being substantially flat in shape and extending substantially in a plane perpendicular to said axis of rotation and comprising a number of radial arms and a number of peripheral bridging elements extending in said plane and connecting the free ends of said arms to one another to define a cavity between each pair of adjacent arms, a number of blades extending radially of said hub, and articulated linkage means connecting each of said blades to said hub, said articulated linkage means comprising, for each of said blades, a substantially U-shaped forked element extending about a respective said bridge element and through a respective said cavity, a radial-thrust type elastomeric bearing, and a damper controlling the movements of said blades in said plane; said elastomeric bearing and said damper being arranged in series between the respective bridge and fork elements, and each said damper consisting of a further elastomeric bearing.

2. A rotor as claimed in claim 1, wherein said further elastomeric bearing is mounted between said bridge element and said radial-thrust elastomeric bearing.

3. A rotor as claimed in claim 2, wherein said further elastomeric bearing comprises an outer cone and an inner cone having corresponding facing surfaces, and a layer of elastomeric material extending between said cones and connecting said corresponding facing surfaces to one another; said inner cone being a portion of said bridge element, and said corresponding facing surfaces being portions of the surface of respective solids of revolution obtained by revolving respective concentric arcs having the same curvature about a chord extending parallel to a longitudinal axis of said bridge element.

4. A rotor as claimed in claim 3, wherein said outer cone has two tabs extending one above the other on opposite sides of said bridge element, said bridge element having a central portion shaped as a convex spherical crown; each said tab having a surface facing said spherical crown and shaped as a concave spherical cap concentric with said spherical crown; and a layer of elastomeric material being interposed between each said tab and said central portion of said bridge element.

* * * * *